(12) United States Patent
Ban

(10) Patent No.: US 6,221,452 B1
(45) Date of Patent: Apr. 24, 2001

(54) ENERGY ABSORBING MEMBER

(75) Inventor: Kazuyoshi Ban, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/168,158

(22) Filed: Oct. 8, 1998

(30) Foreign Application Priority Data

Oct. 8, 1997 (JP) .................................................... 9-275897

(51) Int. Cl.[7] ........................... B29D 22/00; B29D 24/00; F16L 9/14
(52) U.S. Cl. .................... 428/36.91; 428/34.5; 428/34.6; 428/34.7; 428/35.9; 138/109; 138/141; 248/636
(58) Field of Search ................... 428/34.3, 34.5, 428/34.7, 35.9, 36.9, 36.91, 36.92; 138/141, 146, 153, 109, 124, 178; 248/636; 345.1; 310/83; 318/12, 14, 15

(56) References Cited

U.S. PATENT DOCUMENTS

| 4,519,268 | * | 5/1985 | Oda | ........................................ | 74/473 |
| 4,522,963 | * | 6/1985 | Kecskemethy et al. | ............. | 523/510 |
| 5,264,259 | * | 11/1993 | Satoh et al. | ........................... | 428/34.5 |
| 5,629,062 | * | 5/1997 | Ejiri et al. | ............................. | 428/36.9 |
| 5,638,870 | * | 6/1997 | Takada et al. | ......................... | 138/125 |
| 5,699,835 | * | 12/1997 | Nakagawa et al. | ................... | 138/141 |

FOREIGN PATENT DOCUMENTS

| 958288 | 3/1997 | (JP) . |
| 1016597 | 1/1998 | (JP) . |

\* cited by examiner

Primary Examiner—Ellis Robinson
Assistant Examiner—Michael E. Miggins

(57) ABSTRACT

Energy absorbing members are provided between a lever mount bracket that support a shift lever, and a base member of a vehicle body that is located in the front part of a vehicle compartment. The energy support member includes a pipe, and a trigger that is joined to at least one end portion of the pipe, and the trigger includes a truncated conical portion whose inclined surface causes plastic deformation of the end portion of the pipe in the direction for increasing the diameter of the pipe upon application of an excessive load thereto. The pipe has a three-layer cylindrical core member consisting of an inner continuous glass fiber random mat, a uni-direction continuous glass fiber layer formed on the random mat, and an outer continuous glass fiber random mat formed on the uni-direction glass fiber layer. The layered structure is impregnated with ortho-phthalic acid type unsaturated polyester resin.

8 Claims, 8 Drawing Sheets

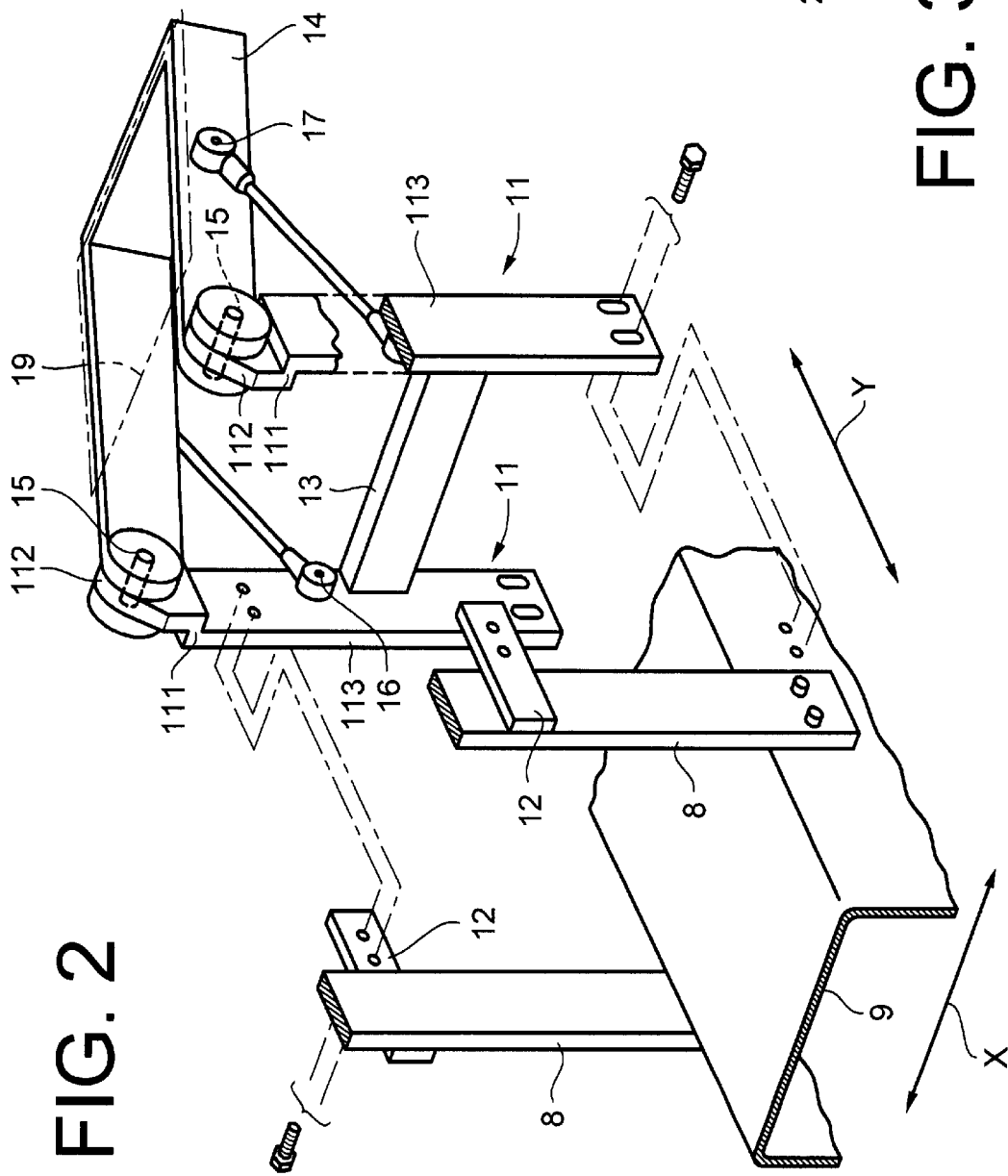

FIG. 5(a)
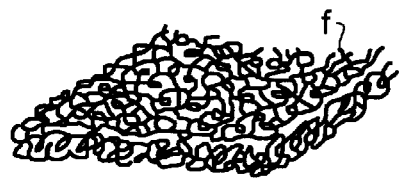
FIG. 5(c)
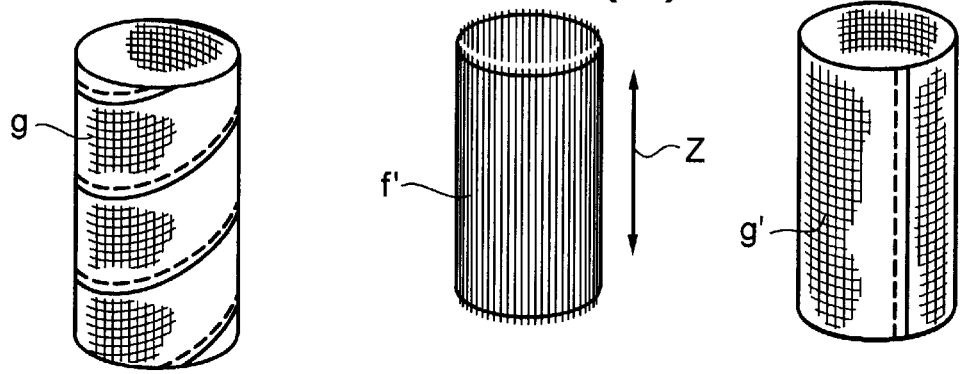
FIG. 5(b)
FIG. 5(d)
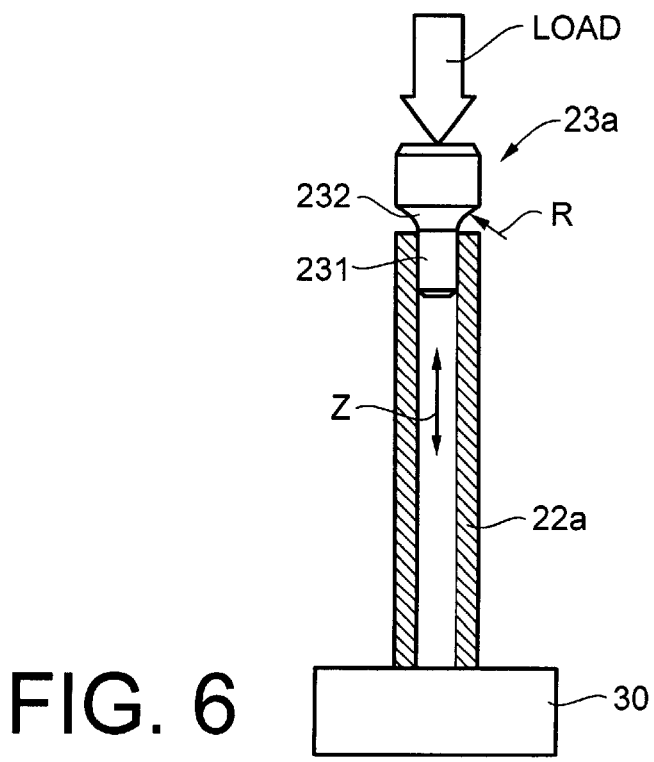
FIG. 6

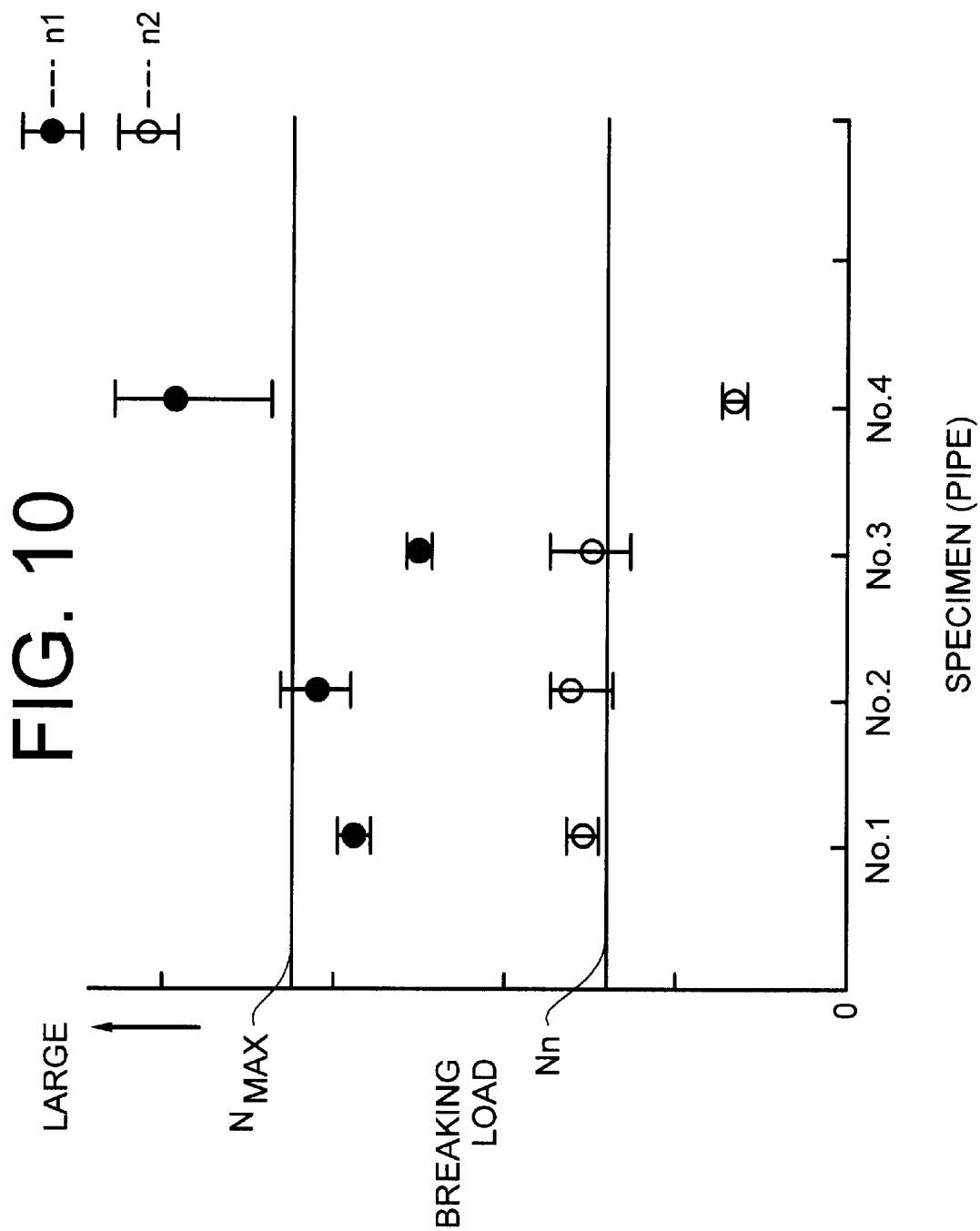

ENERGY ABSORBING MEMBER

FIELD OF THE INVENTION

The present invention relates, in general, to a support structure for a lever mount bracket that supports a vehicle shift lever operable to generate gearshift commands, and in particular to an energy absorbing member suitably used in the support structure for the lever mount bracket attached to a base member of a vehicle body in the vicinity of a driver's seat.

BACKGROUND OF THE INVENTION

Instrument panels installed in the front portion of vehicle compartments, mounting components of the instrument panels, and the like, are designed to meet regulations in terms of shock absorbing characteristics and the shape of protrusions, in an attempt to protect vehicle passengers against shocks upon crash of the vehicles.

In the meantime, a shift lever to be manipulated by a vehicle driver to generate gearshift commands is provided on the instrument panel in the vicinity of the driver's seat, or on an upper surface of a front console located in a central, front portion of the vehicle compartment. The shift lever also needs to be designed to provide desired shock absorbing characteristics, similarly to the surface portion of the instrument panel.

To provide suitably controlled rigidity in the protruding direction of the shift lever upon application of an excessive load thereto, a known type of shift lever includes a shaft portion in the shape of a pipe that is formed of a fiber reinforced plastic material, and a shock absorbing portion provided at an end portion of the pipe. In this case, when an excessive load is applied to a knob of the shift lever, the shock absorbing portion expands and ruptures the end portion of the pipe in the direction perpendicular to the axis of the pipe, thereby to absorb shocks, so that the deceleration experienced by the passenger is limited to be equal to or smaller than its regulation value. One example of this type of shift lever is disclosed in Japanese laid-open Patent Publication (Kokai) No. 9-58288.

In case the shift lever is mounted on the instrument panel, a lever mount bracket, that supports the shift lever, is attached to a base member of the vehicle body located below the instrument panel by a pipe-like connecting member(s) provided between the bracket and the base member. It has been proposed to form the connecting member from a pipe having a suitable shock absorbing function. One example of such an arrangement is disclosed in the specification and drawings of Japanese Patent Application No. 8-18596.

In normal use of the shift lever with the shock absorbing member, as disclosed in Japanese laid-open Patent Publication No. 9-58288, a load (bending stress) is frequently applied to the lever in the bending direction, and it is therefore difficult ensure a sufficiently high durability of the shift lever.

Each of the pipes as disclosed in Japanese laid-open Patent Publication No. 9-58288 and Japanese Patent Application No. 8-18596 is formed of a fiber reinforced plastic material. When, however, the shock absorbing portion expands and ruptures the end portion of the pipe in the direction perpendicular to the axis of the pipe, the maximum breaking load with which the pipe starts breaking or rupturing is undesirably increased if the strength of the pipe end portion is excessively large, thus making it difficult to reduce the deceleration of the passenger to be equal to or lower than the regulation value. It is also important to provide a sufficiently increased average breaking load after the shock absorbing portion starts rupturing in the axial end portion of the pipe, in order to maintain the desired shock absorbing function. Namely, the desired shock absorbing function of the pipe can be accomplished by reducing the maximum breaking load, and increasing the average breaking load, and, in particular, the pipe is required to provide stable breaking characteristics, with significantly reduced variations in the maximum breaking load and the average breaking load.

On the other hand, each of the pipes, as disclosed in Japanese laid-open Patent Publication No. 9-58288 and Japanese Patent Application No. 8-18596, has not been considered well in terms of its material, in order to achieve the above-described shock absorbing function, and it is difficult for the lever mount bracket support structure using the pipe to reduce the maximum breaking load and increase the average breaking load. Furthermore, both the maximum breaking load and average breaking load tend to vary or fluctuate, thus making it impossible to assure stable shock absorbing characteristics.

It is therefore an object of the present invention to provide an energy absorbing member having sufficiently high durability, wherein rupture or breaking takes place with reduced maximum breaking load and increased average breaking load, and wherein variations in both of the loads are sufficiently reduced to ensure stable shock absorbing characteristics.

SUMMARY OF THE INVENTION

To accomplish the above object, the present invention provides an energy absorbing member, comprising: a pipe-like member having a plurality of laminated layers including a continuous glass fiber random mat, and a uni-direction continuous glass fiber layer, in which glass fibers are arranged in an axial direction of the pipe-like member, the plurality of laminated layers being formed into a cylindrical shape, each of the laminated layers being impregnated with a resin; and a trigger member joined to an end portion of the pipe-like member, the trigger member having an inclined surface that expands the end portion of the pipe-like member when the trigger member is pushed into the pipe-like member in an axial direction thereof.

With the pipe-like member constructed as described above, the uni-direction continuous glass fiber layer, in which glass fibers are arranged only in the axial direction of the pipe, ensures a sufficiently high flexural rigidity of the pipe-like member in its normal use. When the end portion of the pipe-like member starts expanding and rupturing upon application of an excessively large load thereto, the pipe-like member exhibits a suitable strength against the expansion and ruptures. Therefore, the maximum breaking load can be limited to a relatively low value. Further, since the pipe-like member keeps rupturing while the continuous glass fiber random mat is being expanded, the average breaking load can be increased, and the rupture of the pipe-like member occurs in a stable form. Thus, the maximum breaking load can be reduced, and the average breaking load can be increased, while reducing variations in both of the loads, and assuring stable shock absorbing characteristics.

BRIEF DESCRIPTION OF THE DRAWINGS

The present invention will become more fully understood from the detailed description given hereinbelow and the accompanying drawings which are given by way of illustration only, and thus are not limitative of the present invention, and, wherein:

FIG. 2 is a perspective view of a principal portion of the lever mount bracket support structure of FIG. 1;

FIG. 3 is an enlarged perspective view showing a principal portion of a pipe that provides one of the energy absorbing members of the lever mount bracket support structure of FIG. 1;

FIG. 5(a) through FIG. 5(c) schematically show the arrangement of continuous glass fibers that constitute a cylindrical core member of the pipe of FIG. 3, wherein FIG. 5(a) shows a random mat of glass fibers, FIG. 5(b) shows a tape formed from a plain weave cloth of glass fibers, and FIG. 5(c) shows a non-woven cloth of glass fibers, and FIG. 5(d) shows a non-woven cloth of continuous glass fibers;

FIG. 6 is a view for explaining a compression test conducted on the pipe as shown in FIG. 1;

FIG. 10 is a graph showing distributions of the maximum breaking load and the average breaking load with respect to four specimens of pipes made of different materials.

DETAILED DESCRIPTION OF THE PREFERRED EMBODIMENT(S)

Figure 1:
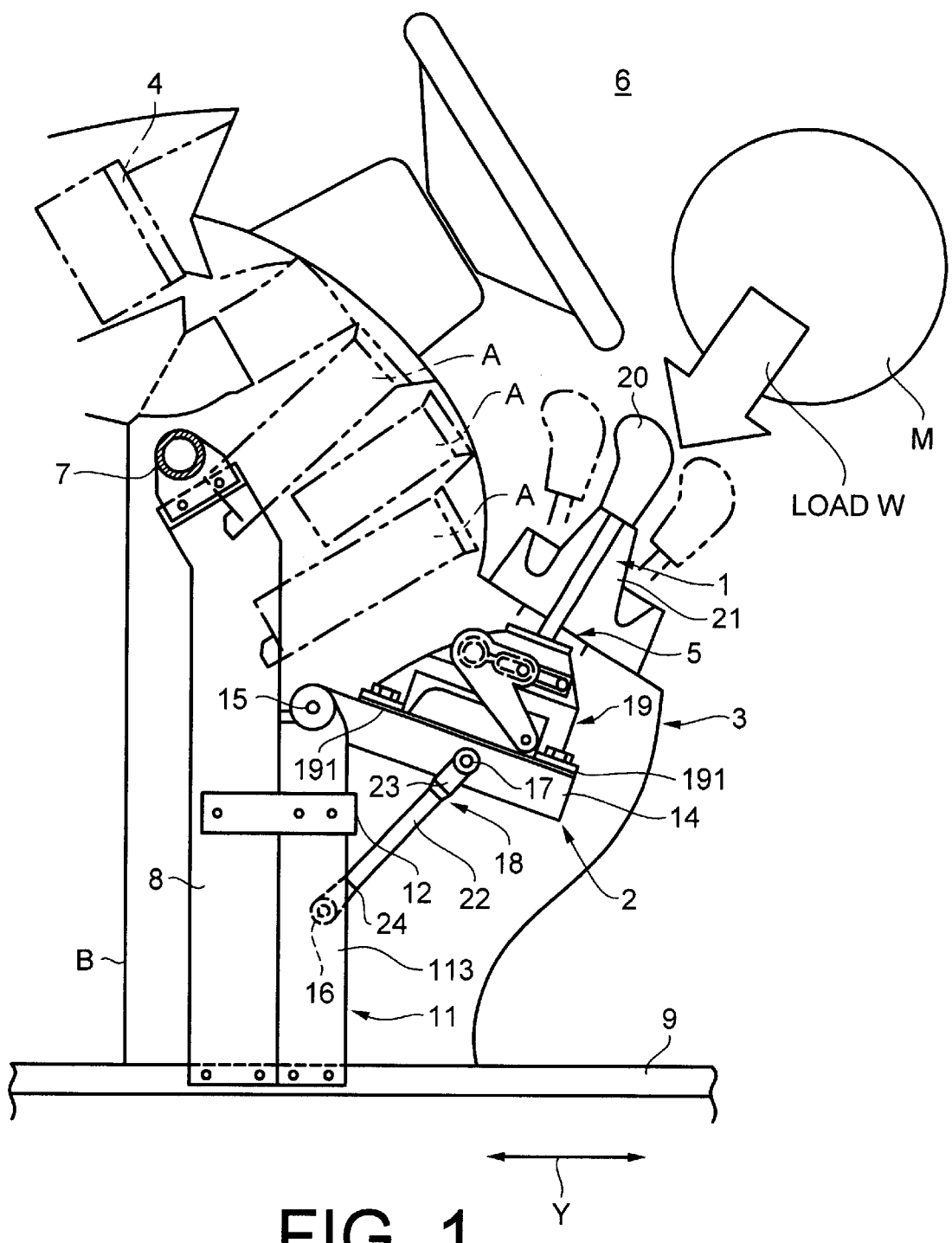
FIG. 1 is a schematic view showing the front portion of a vehicle compartment equipped with a lever mount bracket support structure using energy absorbing members according to one embodiment of the present invention.

FIG. 1 and FIG. 2 show a lever mount bracket support structure using energy absorbing members as one preferred embodiment of the present invention. The lever mount bracket support structure is used for attaching a lever mount bracket 2 to a base member of a vehicle body that is located below an instrument panel 3. The lever mount bracket 2 supports a shift lever 1 of a one-box vehicle (not illustrated) such that the shift lever 1 may pivot about its lower end portion.

The instrument panel 3 has meters 4 and various vehicle accessories A mounted therein, and an opening 5 for receiving a gearshift assembly is formed at a substantially central portion of the instrument panel 3 as viewed in the vehicle width direction X (perpendicular to the plane of the sheet of FIG. 1). The shift lever 1, operable to generate a gearshift command, is disposed in the opening 5 receiving the gearshift assembly. The peripheral portion of the instrument panel 3 is secured to an inner body constituent member B that faces a front portion 6 of the vehicle compartment, and the whole structure of the panel 3 is supported by a front deck cross member 7 that extends between left and right front pillars (not illustrated) of the vehicle. The cross member 7 serves as a reinforcing member for ensuring sufficiently high strength as measured in the vehicle width direction X (perpendicular to the plane of the sheet of FIG. 1), and a pair of vertical columns 8 (refer to FIG. 2) are joined to the middle portion of the cross member 7. The lower ends of the vertical columns 8 are joined to a mounting portion of the floor 9 of the vehicle, such that the columns 8 extend in parallel with each other in the vertical direction with a certain spacing therebetween. As shown in FIG. 2, a pair of auxiliary vertical columns 11 abut the rear faces of the pair of vertical columns 8 (as viewed in the front-to-rear direction Y of the vehicle body), and the lower ends of the auxiliary vertical columns 11 are joined to the floor 9. Each of the auxiliary vertical columns 11 is joined, at its upper portion, to a corresponding one of the left and right vertical columns 8 via a connecting piece 12, such that the columns 8, 11 and connecting piece 12 form an integral unit or assembly. The pair of auxiliary vertical columns 11 are connected to each other by means of a beam member 13.

Each of the auxiliary vertical columns 11 includes a bent portion 111 formed at its upper end, and a pivot portion 112 formed above the bent portion 111. Further, a pair of upper pins 15 and a pair of lower pins 16 (only one of each pair is shown in FIG. 1) that extend in the vehicle width direction X are formed on the respective auxiliary vertical columns 11 to protrude from the pivot portions 112 and middle portions 113, respectively. A rectangular frame 14, as part of the lever mount bracket 2, is pivotally attached at its proximal ends to the upper pins 15, and distal-end pins 17 (only one of which is shown in FIGS. 1 and 2), that extend in the vehicle width direction X, are also formed on the rectangular frame 14 to protrude from its opposite side portions closer to the distal or free end of the frame 14.

A pair of left and right bracket supports 18, that serve as energy absorbing members, extend between the auxiliary vertical columns 11 and the opposite side portions of the rectangular frame 14. Each of the bracket supports 18 is joined at its opposite ends to the distal-end pin 17 that protrudes from the rectangular frame 14, and the lower pin 16 that protrudes from the auxiliary vertical column 11, respectively, so that the rectangular frame 14 is securely supported by the auxiliary vertical columns 11. A casing 19 is mounted on the upper face of the rectangular frame 14, and corner portions 191 (shown in FIG. 1) of the casing 19 are fastened to the rectangular frame 14 by means of bolts, to thus provide an integral assembly of the casing 19 and the frame 14. The casing 19 supports the shift lever 1 that protrudes from its upper portion such that the shift lever 1 may pivot about its proximal end, and also incorporates select and shift switches (not shown) that generate gearshift signals when the shift lever 1 is operated or manipulated along an indicator (not shown). A knob 20 is fixed to the distal end portion of the shift lever 1 that protrudes from the instrument panel 3, and the space between the knob 20 and the opening 5 formed in the instrument panel 3 is covered with a bellows-like boot 21 made of rubber.

The casing 19 that supports the shift lever 1, and the rectangular frame 14 formed integrally with the casing 19, constitute the lever mount bracket 2, and the pair of auxiliary vertical columns 11 and the pair of bracket supports 18 constitute the lever mount bracket support structure.

Figure 4A:
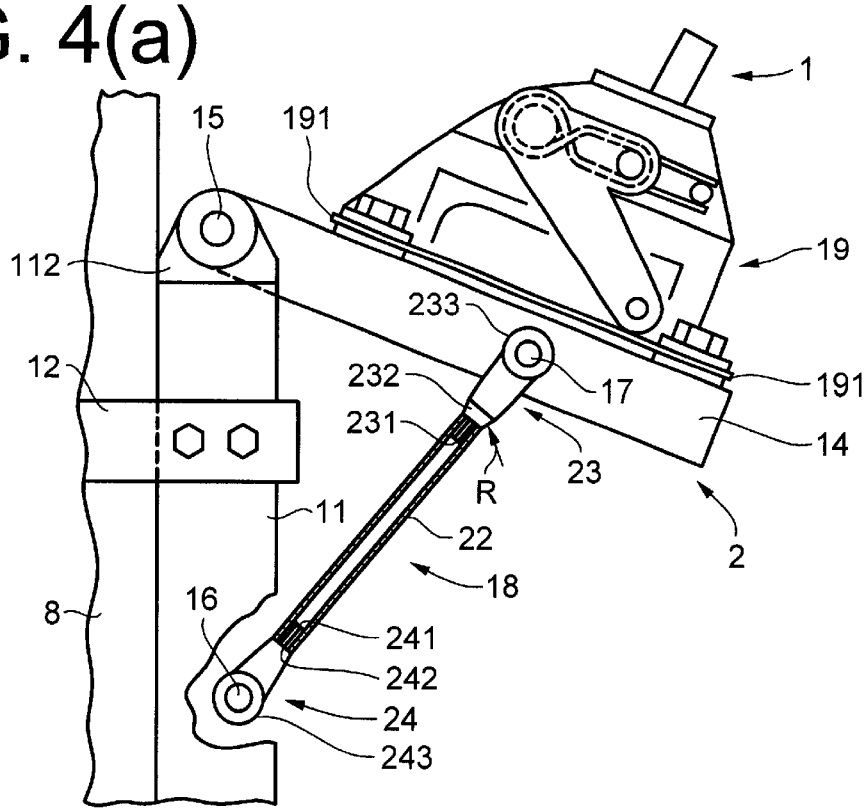
FIG. 4(a) is a side view of a principal portion of the lever mount bracket support structure of FIG. 1 when it is in normal use.

Since both of the left and right bracket supports 18, as energy absorbing members, for limiting the downward pivotal movement of the lever mount bracket 2 have the same construction, only one of the bracket supports 18 will be described in detail. As shown in FIG. 4(a), the bracket support 18 includes a pipe 22, a trigger 23 that is joined to the upper end portion of the pipe 22, and a joint member 24 that is joined to the lower end portion of the pipe 22. The trigger 23 forms an inclined, circumferential surface as described later. The joint member 24 includes an insertion portion 241 on which the lower end portion of the pipe 22 is fitted, a stepped portion 242 whose diameter is made larger than that of the insertion portion 24 so that the lower end of the pipe 22 abuts on the stepped portion 242, and a pin joint portion 243 that extends from the stepped portion 242.

As shown in FIG. 4(a), the trigger 23 includes an insertion portion 231, on which the upper end portion of the pipe 22 is fitted, a truncated conical portion 232 whose diameter continuously increases from the insertion portion 231, and a pin joint portion 233 that extends from the truncated conical portion 232 to be joined to the upper pin 17. These portions 231, 232, 233 are formed integrally with each other. The outside diameter of the insertion portion 231 is equal to the inside diameter of the pipe 22, which is set to 8 mm. The truncated conical portion 232 has a curved, circumferential surface that extends continuously from the outer circumferential surface of the insertion portion 231, and the radius R of curvature of the curved surface is set to be equal to 5 mm where the center of the radius R is located outside the trigger 23. Namely, the circumferential surface of the truncated conical portion 232 curves inward, i.e., toward the axis of the trigger 23.

Figure 8:
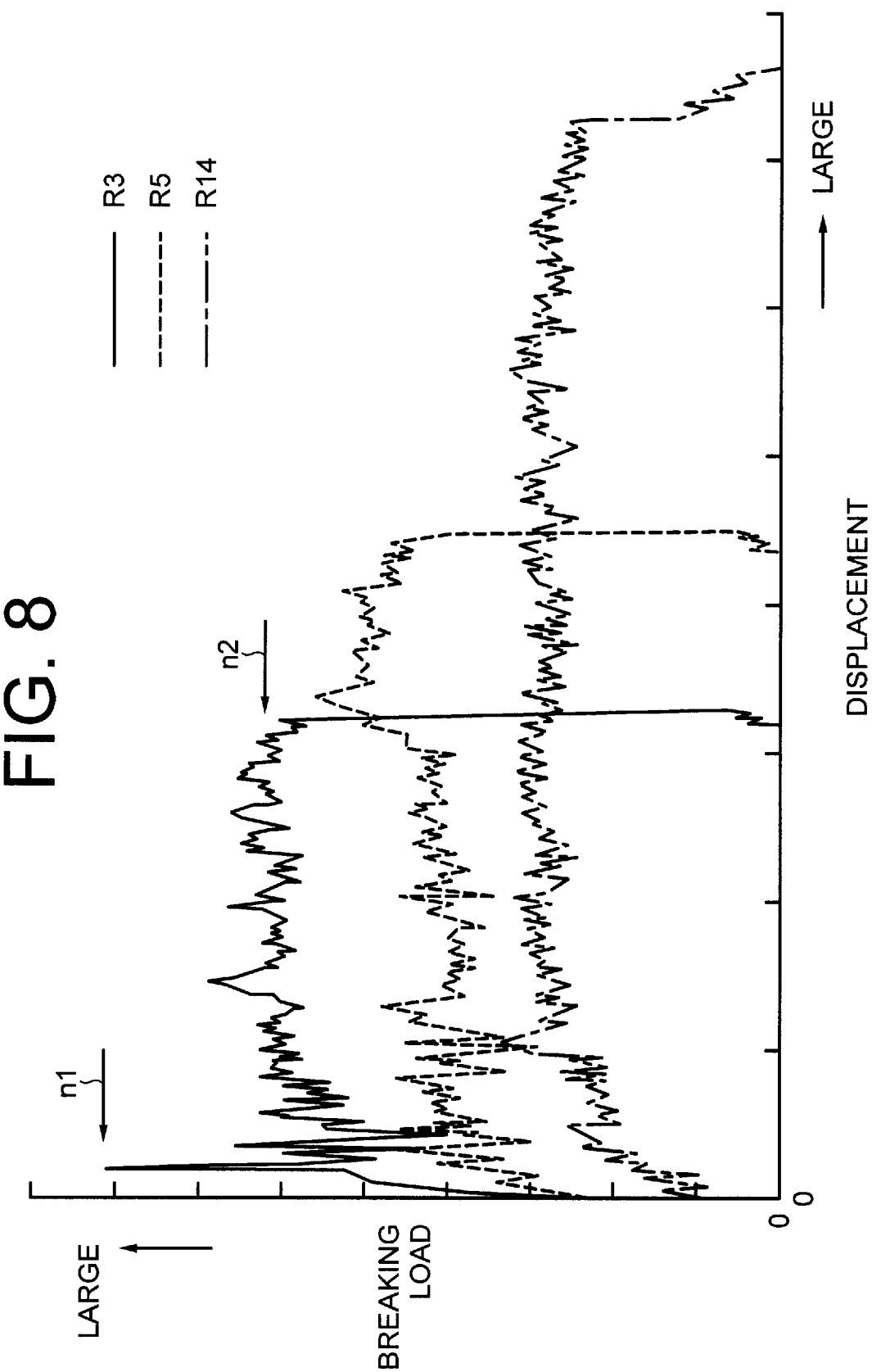
FIG. 8 is a graph showing the relationship between the displacement and the breaking load with respect to different radii R of curvature of the pipe of FIG. 1.
Figure 9:
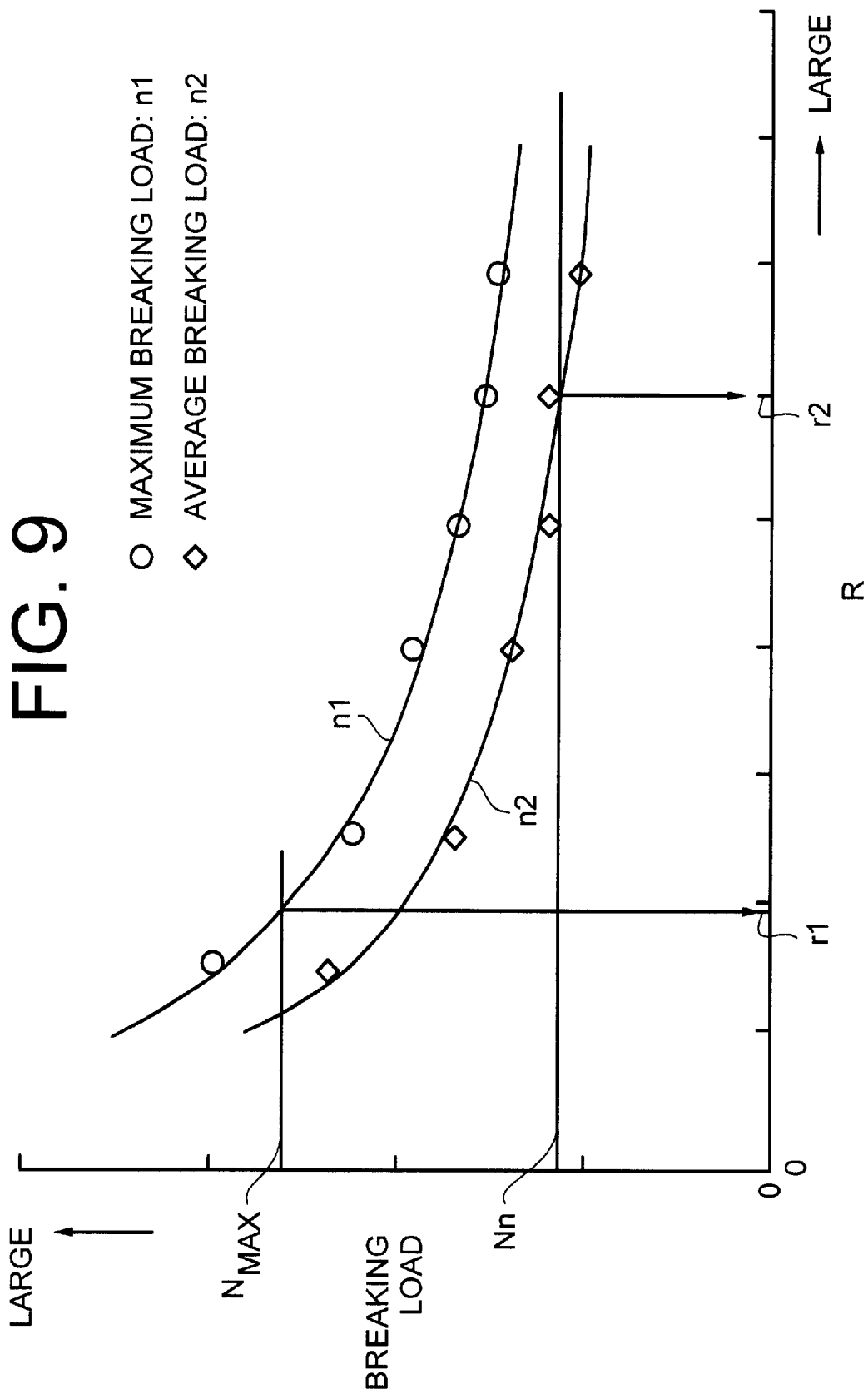
FIG. 9 is a graph showing changes in the maximum breaking load and the average breaking load with changes in the radius R of curvature of a curved surface of a trigger shown in FIG. 1.

The graph shown in FIG. 8 shows the relationship between the displacement and the breaking load, with respect to different radii R of curvature of the truncated conical portion 232, when a load is applied to the trigger 23 to expand and break or rupture the upper end portion of the pipe 22 having material characteristics (No. 1 in TABLE 1) as described later. The graph shown in FIG. 9 shows the relationship between the radius R of curvature and the breaking load. To detect the characteristics as shown in FIGS. 8 and 9, each specimen (represented by pipe 22a in FIG. 6) was placed on a compression test machine, as shown in FIG. 6, and 10 mm/min. of compressive load was applied to the trigger 23a, fitted into the pipe 22a, in the axial direction Z, to expand and break the upper end of the pipe 22a. The graph of FIG. 8 indicates that the maximum breaking load n1 and the average braking load n2 are increased as the radius R of curvature of the curved surface is reduced, namely, as the angle of inclination of the curved surface is rapidly changed. The larger the maximum and average crash loads n1, n2, the shorter time required for completing the expansion and rupture of the upper end of the pipe 22a. FIG. 9 shows results of measurement of the permissible range (r1–r2) of the radius R of curvature in which the maximum breaking load n1 and the average breaking load n2 can be held within the range of the target maximum breaking load $N_{max}$ and the target average breaking load Nn. From the results as shown in FIG. 9, the radius R of curvature of the truncated conical portion 232 was set to be equal to 5 mm.

Figure 7:
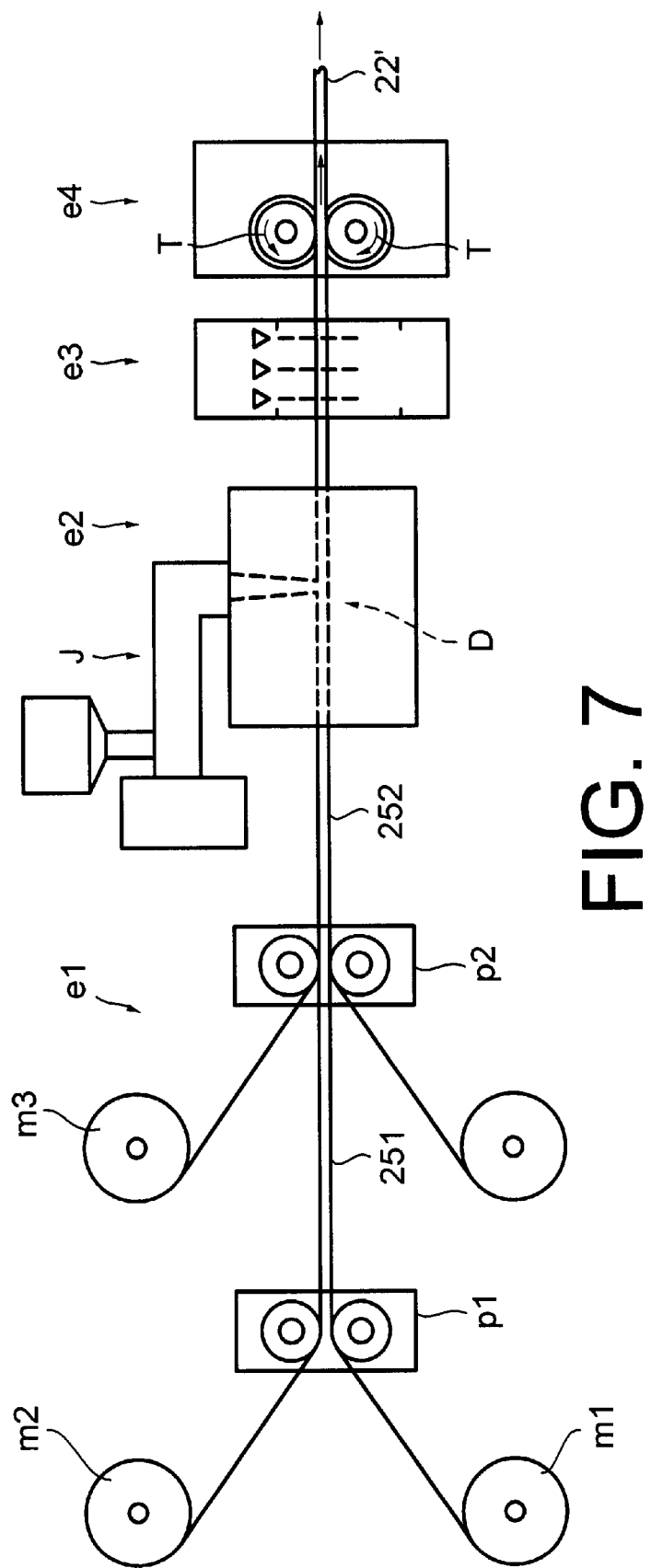
FIG. 7 is a schematic view showing the construction of a drawing machine used for forming the pipe of FIG. 1.

The pipe 22 is formed by a drawing machine as shown in FIG. 7. In particular, the pipe 22 is formed from a cylindrical core member 25 as described later, which is impregnated with ortho-phthalic acid type unsaturated polyester resin. The use of the ortho-phthalic acid type unsaturated polyester resin makes it easier to form core materials into the pipe 22, and also provides a strength suitable for expansion and rupture of the pipe 22, as described later. Namely, a pipe that is formed using unsaturated polyester resin of maleic anhydride or fumaric acid type tends to exhibit an excessively high strength upon expansion and rupture thereof, whereas the pipe 22 using the ortho-phthalic acid type unsaturated polyester resin exhibits a relatively low strength upon expansion and rupture thereof.

Next, the cylindrical core member 25 used for the pipe 22 will be described with reference to FIG. 5(a) to FIG. 5(d). The cylindrical core member 25 has a triple-layered structure, in which three layers of the following materials are successively laminated into a cylindrical shape. The layered structure consists of a continuous glass fiber random mat Mat, in which glass fibers are randomly distributed as shown in FIG. 5(a), a uni-direction glass fiber sheet Rov that is laminated on the outer surface of the glass fiber mat Mat, and consists of glass fibers that are continuously arranged in the axial direction of the pipe, as shown in FIG. 5(c), and a continuous glass fiber mat Mat of FIG. 5(a) laminated on the outer surface of the uni-direction glass fiber sheet Rov. To provide the glass fiber mat Mat as shown in FIG. 5(a), thin glass fibers f (each having a diameter of 10–13 $\mu$m, for example) are randomly bent and successively stacked into the shape of a mat. To provide the uni-direction glass fiber sheet Rov as shown in FIG. 5(c), glass fibers f' (each having a diameter of 10–13 $\mu$m, for example) are oriented in the direction Z of the pipe axis, and successively arranged and formed into a cylindrical layer.

FIG. 5(b) shows a tape g consisting of a plain weave cloth of continuous glass fibers, and FIG. 5(d) shows a non-woven cloth of continuous glass fibers. The tape g of FIG. 5(b) is obliquely wound into a cylindrical shape while it is being inclined, such that corresponding edge portions of the tape-like plain weave cloth are successively superposed on each other. The non-woven cloth g' having a large width is rounded, or formed into a cylindrical shape. The tape g and the non-woven cloth g' may be superposed on the glass fiber mat Mat, or the like. The rupture characteristics of the tape and cloths g, g' will be described later.

Next, a method of forming the pipe 22 using the drawing machine as shown in FIG. 7 will be described. The drawing machine used in this method includes a core member forming portion e1, in which the cylindrical core member 25 of the pipe 22 is formed, a resin filling portion e2, a hardening portion e3, and a pull-out portion e4, which are continuously arranged in this order.

The core member forming portion e1 includes an inner mat supply portion m1 that forms the inner glass fiber mat Mat into a strip-like shape, and supplies it to a first press portion p1, a roving supply portion m2 that forms a uni-direction glass fiber material sheet into a strip-like shape, and supplies it to the first press portion p1, and an outer mat supply portion m3 that forms the outer glass fiber mat Mat into a strip-like shape, and supplies it to a second press portion p2. In the first press portion p1, the inner glass fiber mat Mat and the uni-direction glass fiber sheet Rov are bonded to each other under a pressure, with a paste made of polyester being supplied to the press portion p1, so that a two-layer bonded strip 251 is supplied to the second press portion p2. In the second press portion p2, the two-layer strip 251 and the outer glass fiber mat Mat are bonded to each other under a pressure, with a paste (not illustrated) being supplied to the press portion p2, so that a three-layer bonded strip 252 is supplied to the resin filling portion e2.

The resin filling portion e2 includes a die D for forming the cylindrical core member 25, and an injector J connected to the die D. The die D continuously deforms the three-layer bonded strip 252 supplied to its inlet, into an annular shape, to thus form the cylindrical core member 25. Then, ortho-phthalic acid type unsaturated polyester resin is supplied from the injector J into clearances of the cylindrical core member 25, so that the core member 25 is impregnated with ortho-phthalic acid type unsaturated polyester resin. The pipe 22 that has left the die D in a softened state reaches the hardening portion e3 where the pipe 22 is hardened, and then reaches the pull-out portion e4. The pull-out portion e4 includes a pair of pull-out rollers that grips the continuous pipe 22'. The rollers are driven with pulling torque T applied thereto, so that the continuous pipe 22' is pulled out of the die D. Thereafter, the continuous pipe 22' is cut into individual pipes 20.

The pipe 22 formed in the above-described manner is constructed such that the three-layer cylindrical core member 25 consists of the inner glass fiber mat Mat, uni-direction glass fiber layer Rov formed on the outer surface of the glass fiber mat Mat, and the outer glass fiber mat Mat formed on the outer surface of the uni-direction glass fiber layer Rov, as shown in FIG. 3, and the core member 25 is impregnated with ortho-phthalic acid type unsaturated polyester resin. The composition of the pipe 22, thus constructed, is indicated in TABLE 1, in which the pipe 22 corresponds to No. 1. In TABLE 1, the compositions of pipes No. 2 and No. 3, as comparative examples, are also shown. The pipe No. 2 has a two-layer cylindrical core member consisting of a uni-direction glass fiber layer Rov, and a glass fiber mat Mat laminated on the outer surface of the layer Rov, which core member is impregnated with ortho-phthalic acid type unsaturated polyester resin. The pipe No. 3 has a three-layer cylindrical core member consisting of a uni-direction glass fiber layer Rov, a tape g formed from a plain weave cloth (FIG. 5(b)) of continuous glass fibers, which is formed on the outer surface of the glass fiber layer Rov, and a glass fiber mat Mat formed on the outer surface of the tape g. The core member of the pipe No. 3 is also impregnated with ortho-phthalic acid type unsaturated polyester resin.

TABLE 1

| No. | Type | Material Weight Content (%) | | | Glass Content (%) |
| --- | --- | --- | --- | --- | --- |
| | | Rov | Mat | G. Tape | |
| 1 | Mat/Rov/Mat | 39 | 30 | 0 | 69 |
| 2 | Rov/Mat | 39 | 28 | 0 | 67 |
| 3 | Rov/Tape/Mat | 39 | 16 | 12 | 67 |

Each of the pipes No. 1 through No. 3 of TABLE 1 was supplied to the compression test machine as shown in FIG. 6, to detect the breaking load characteristics of the pipe, and the results are shown in FIG. 10. Pipe No. 4 shown in FIG. 10 has the same cylindrical core member 25 as that of the pipe No. 1, but uses maleic anhydride type unsaturated polyester resin, instead of ortho-phthalic acid type unsaturated polyester resin as used in the pipe No. 1.

In the compression test, the trigger 23a including the insertion portion 231 and the truncated conical portion 232 with a curved surface whose radius R of curvature is equal to 5 mm is attached to the upper end portion of each pipe 22a as a specimen, and the lower end portion of the pipe 22a is placed on the base 30. In this state, 10 (mm/min.) of compressive load is applied to the trigger 23a in the axial direction Z of the pipe, to expand and break the upper end portion of the pipe 22a.

As described above, the pipe No. 4 uses maleic anhydride type unsaturated polyester resin, instead of ortho-phthalic acid type unsaturated polyester resin. As is apparent from FIG. 10, the maximum breaking load (indicated as "n1" in FIG. 10) exceeds the target maximum breaking load $N_{max}$ (for example, 1300N), which means that the pipe No. 4 cannot be suitably used as an impact absorbing member whose strength is to be controlled for desired expansion and rupture. In this respect, the pipe No. 1 formed of ortho-phthalic acid type unsaturated polyester resin has a suitable strength that enables desired expansion and rupture thereof. The pipe No. 2 is formed by eliminating the inner glass fiber mat Mat from the pipe No. 1, to provide a two-layer cylindrical core member 25. As is apparent from FIG. 10, the pipe No. 2 shows greater variations in both of the maximum breaking load and the average breaking load (indicated as "n2" in FIG. 10), and the impart absorbing characteristics are unstable or likely to vary, though the maximum and average loads may be within the range of the target values $N_{max}$, Nn. The pipe No. 3 does not include the inner glass fiber mat Mat, but includes the tape g between the uni-direction glass fiber layer Rov and the outer glass fiber mat Mat, as compared with the pipe No. 1. The average breaking load of the pipe No. 3 may become smaller than the target average breaking load, due to tensile rupture of the cloth of the tape, and differences in the laminated areas of the edges of the tape, and thus the pipe No. 3 shows unstable impact absorbing characteristics.

In the pipe 22 of No. 1 used in the lever mount bracket support structure of FIG. 1, on the other hand, the glass fiber mats Mat are disposed on the inside and outside of the uni-direction glass fiber sheet Rov. With this arrangement, the trigger 23 having the truncated conical portion 232 with a curved surface starts expanding and rupturing the inner glass fiber mat Mat of the upper end portion of the pipe 22, and subsequently ruptures the uni-direction glass fiber sheet Rov on the outer surface of the inner glass fiber mat Mat, and the outer glass fiber mat Mat on the outer surface of the uni-direction glass fiber sheet Rov. Since the expansion and rupture of the pipe 22 proceeds continuously as the trigger 23 is pushed into the pipe 22, variations in the maximum load are made relatively small, and reduction in the average load is limited or avoided, whereby the pipe 22 exhibits stable breaking characteristics. Further, the uni-direction glass fiber sheet Rov in which glass fibers extend in the axial direction Z of the pipe is provided between the inner and outer glass fiber mats Mat, and this roving material serves to maintain a sufficiently high flexural rigidity of the pipe 22 during its normal use.

The lever mount bracket support structure of FIG. 1, while in normal use, is able to support the shift lever 1 protruding therefrom through the shift assembly opening 5 formed in the instrument panel 3, and the shift lever 1 generates a gearshift command when it is pivotally moved or operated to a desired shift position. The rectangular frame 14 that constitutes the lever mount bracket 2 is joined at its pivot to the pair of auxiliary vertical columns 11 by means of pins, and is also connected to the middle portions 113 of the columns 11 via the bracket supports 18. In this support arrangement, large flexural loads are not applied to the pipes 22 of the bracket supports 18 even with repeated gearshift operations, and the uni-direction glass fiber sheet Rov of each pipe 22 ensures high flexural rigidity, whereby the support structure assures a sufficiently high durability in its normal use.

Figure 4B:
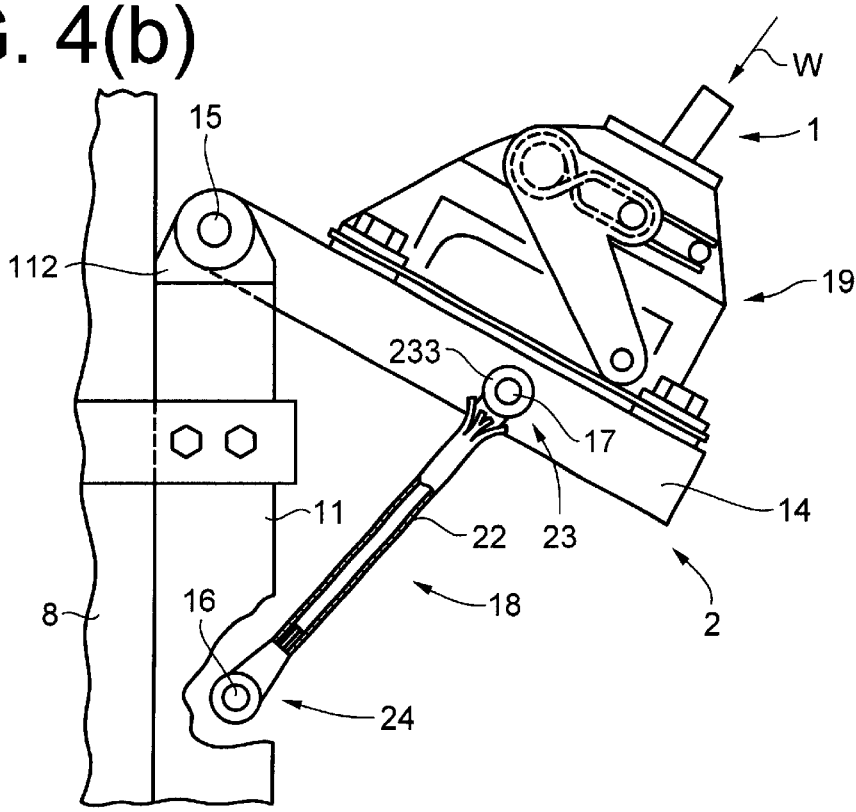
FIG. 4(b) is a side view showing the state of the lever mount bracket support structure of FIG. 1 when it receives an excessively large load upon crash of the vehicle.

In the case where a passenger M hits the knob 20 of the shift lever 1 upon crash of the vehicle, for example, an excessively large load W is applied to the lever mount bracket support structure. In this case, the excessive load W received by the shift lever 1 is applied to the bracket supports 15, and at the same time the triggers 23 cause the upper end portion of the pipes 22 to expand and rupture, as shown in FIG. 4(b). Owing to the expansion and rupture, the pipes 22 absorb the excessive load W, and reduce the deceleration experienced by the passenger M when hitting the knob of the shift lever 1. Further, the impact received by the passenger M can be surely absorbed and reduced while the end portions of the pipes 22 are continuously expanding and rupturing. In particular, the pipe 22 is formed using the cylindrical core member 25 adapted for achieving desired expansion and rupture, and ortho-phthalic acid type unsaturated polyester resin, and the cylindrical core member 25 is constructed such that the uni-direction glass fiber sheet Rov is located in the middle of the core member 25, and the glass fiber mats Mat are disposed on the inside and outside of the uni-direction glass fiber sheet Rov. With this arrangement, the maximum breaking load n1 has relatively small variations, and can be kept equal to or smaller than the target maximum breaking load $N_{MAX}$ that has been set in advance. Also, the average breaking load n2 is made relatively high, and can be kept equal to or larger than the target average load Nn. By use of the pipes 22 having the above-described characteristics, the lever mount bracket support structure of the present embodiment ensures a reduced maximum breaking load n1 and an increased average breaking load n2 with high reliability, thereby to surely absorb and attenuate an impact received by the passenger upon crash of the vehicle, thus assuring improved safety.

In the illustrated embodiment, the bracket support 18, serving as an energy absorbing member, has the trigger 23 (having a curved surface) that is joined to the upper end of the pipe 22, and the joint member 24 joined to the lower end of the pipe 22. Depending upon the case, triggers 23 may be joined to the upper and lower end portions of the pipe 22, so that one of the upper and lower triggers 23 expands and ruptures a corresponding one of the upper and lower end portions of the pipe 22 upon crash of the vehicle. In this case, either one of the upper and lower end portions of the pipe 22 is sure to expand and rupture upon crash of the vehicle, and therefore an impact received by the passenger can be surely absorbed and reduced, assuring improved safety. Furthermore, the lever mount bracket support structure of FIG. 1 is constructed such that the shift lever 1 that generates gearshift commands protrudes from the opening 5 formed in the instrument panel 3. Instead, a lever mount bracket support structure may be used wherein a shift lever is mounted on a front floor console (not illustrated) located at a side portion of the driver's seat in the middle of the vehicle compartment. In this case, too, the lever mount bracket is connected to central protruding portions of the front floor, using bracket supports (not shown) similar to those as shown in FIG. 1, thus providing the same effects as provided by the bracket supports 18 of FIG. 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An energy absorbing member, comprising:

a tubular member having a plurality of laminated layers including a continuous glass fiber random mat, and a uni-direction continuous glass fiber layer, in which glass fibers are arranged in an axial direction of the tubular member, said plurality of laminated layers being formed into a cylindrical shape, each of said laminated layers being impregnated with a resin; and a trigger member joined to an end portion of said tubular member, said trigger member having an inclined circumferential surface that expands the end portion of the tubular member when the trigger member is pushed into the tubular member in an axial direction thereof.

2. An energy absorbing member as defined in claim 1, wherein said tubular member includes said continuous glass fiber random mat as a first layer, said uni-direction continuous glass fiber layer as a second layer, and said continuous glass fiber random mat as a third layer, said first layer, said second layer, and said third layer being laminated on each other.

3. An energy absorbing member as defined in claim 1, wherein said resin includes a thermosetting resin.

4. An energy absorbing member as defined in claim 3, wherein said thermosetting resin includes ortho-phthalic acid.

5. An energy absorbing member as defined in claim 1, wherein said inclined circumferential surface of said trigger member is formed as a curved surface that curves radially inward such that a convex side of the curved surface is located on the side of an axis of the trigger member.

6. An energy absorbing member as defined in claim 5, wherein said curved surface has a radius of about 5 mm.

7. An energy absorbing member, comprising:

a tubular member having a plurality of laminated layers, each of said laminated layers being impregnated with a resin; and a trigger member joined to an end portion of said tubular member, said trigger member having an inclined circumferential surface that expands the end portion of the tubular member when the trigger member is pushed into the tubular member in an axial direction thereof, wherein said inclined circumferential surface of said trigger member includes an inwardly curved surface.

8. An energy absorbing member as defined in claim 7, wherein said inwardly curved surface has a radius of about 5 mm.

* * * * *